United States Patent

Willis

(10) Patent No.: US 7,130,527 B2
(45) Date of Patent: Oct. 31, 2006

(54) SLOW FORWARD TRICK MODE PLAYBACK OF RECORDED VIDEO

(75) Inventor: Donald Henry Willis, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 1162 days.

(21) Appl. No.: 09/972,723

(22) Filed: Oct. 5, 2001

(65) Prior Publication Data

US 2003/0068156 A1    Apr. 10, 2003

(51) Int. Cl.
 H04N 5/91    (2006.01)
 H04N 7/26    (2006.01)
(52) U.S. Cl. .......................... 386/68; 386/111
(58) Field of Classification Search ............ 386/68, 386/111, 109, 112, 27, 33, 125, 6, 7, 76, 113, 386/114; H04N 5/91, 2/26
 See application file for complete search history.

(56) References Cited

U.S. PATENT DOCUMENTS 5,040,061 A * 8/1991 Yonemitsu ............. 375/240.13
5,282,049 A * 1/1994 Hatakenaka et al. ........ 386/111
5,377,051 A * 12/1994 Lane et al. .................... 386/81

OTHER PUBLICATIONS

Copy of Search Report dated Oct. 16, 2002.

* cited by examiner

*Primary Examiner*—Robert Chevalier
(74) *Attorney, Agent, or Firm*—Joseph J. Laks; Robert B. Levy; Jorge Tony Villabon

(57) ABSTRACT

The invention concerns a method (200) and system (100) for producing an optimal slow forward trick mode playback of a portion of video containing a plurality of pictures wherein at least a portion of the plurality of pictures are predictive pictures. The invention includes the steps of: receiving (210) a slow forward trick mode command; and inhibiting (216) the display of an initial set of the plurality of pictures prior to obtaining a properly decoded predictive picture from the initial set of the plurality of pictures. The invention can also include the steps of: selectively decoding (214) the plurality of pictures to obtain the properly decoded predictive picture from the initial set of the plurality of pictures; and decoding (218) subsequent pictures in the portion of video using the properly decoded predictive picture to obtain subsequent properly decoded pictures.

14 Claims, 2 Drawing Sheets

SLOW FORWARD TRICK MODE PLAYBACK OF RECORDED VIDEO

BACKGROUND OF THE INVENTION

1. Technical Field

The inventive arrangements relate generally to video recording systems and more particularly to video recording systems that record digitally encoded video sequences onto disc media such as recordable digital video discs, hard drives and magneto optical discs.

2. Description of Related Art

MPEG video generally uses three types of picture coding methods: Intra (I) pictures, predictive (P) pictures and bidirectional predictive (B) pictures. I pictures are encoded or decoded independently of any other picture. This creates a reference picture from which P and B pictures, or non-I pictures, can be constructed.

A number of MPEG video signals, however, are encoded without I pictures. In particular, many U.S. cable systems broadcast MPEG signals that do not contain I pictures. At first glance, such a video signal appears impossible to decode since there are no I pictures from which to construct the P and B pictures.

Nevertheless, a video signal without any I pictures can be decoded by most MPEG decoders because a separate portion of each P picture in the signal is typically composed of I macroblocks. That is, successive P pictures containing I macroblocks can be used to eventually properly decode a P picture, which can then be used to decode the remaining pictures in the video signal. As an example, in a sequence of five P pictures, twenty percent of each P picture can contain I macroblocks. For example, the top twenty percent of the first P picture can be composed of I macroblocks and the lower eighty percent can be composed of P macroblocks. Referring to the second P picture in the video signal, the portion representing the twenty percent of the picture immediately below the top twenty percent can comprise I macroblocks while the lower sixty percent and the top twenty percent can be composed of P macroblocks. Thus, a different portion of each successive P picture contains I macroblocks. Hence, the bottom twenty percent of the last P picture can contain I macroblocks.

These I macroblocks, along with the P macroblocks contained in the P pictures, can be used to assemble each successive P picture. Specifically, as each P picture is decoded, the I and P macroblocks can be stored in memory. As such, the decoder can generally properly decode the fifth P picture, from which the remaining P and B pictures can be properly decoded.

During normal playback of a video signal having no I pictures, there is a brief period in which the picture quality suffers at the initiation of the playback. This is because the pictures at the beginning of the playback must be constructed from the P pictures that are not yet properly decoded. As an example, the first P picture in the playback signal normally contains the first portion of I macroblocks. Thus, the P and B pictures that are constructed from the first P picture cannot be properly decoded, as the first P picture contains only roughly twenty percent of the information needed to produce these pictures. As the playback continues, however, the picture quality improves since more of the P pictures are decoded thereby providing a greater number of correctly decoded I and P macroblocks until a properly decoded P picture is acquired. This initial reduction in picture quality is acceptable since it is brief, as a properly decoded picture is usually constructed within the first one-half to one second of normal playback of the video.

Significantly, however, the delay in building a properly decoded P picture in a signal lacking I pictures may be prolonged during a trick mode. As an example, during a slow motion trick mode in a forward direction, each of the pictures in the replay material are repeated during the playback one or more times depending on the slow motion playback speed. For instance, if the playback speed is ⅓ ×(1× is normal playback speed), then each picture is displayed and then repeated twice. Thus, in this example, each of the improperly decoded pictures are displayed and then repeated twice thereby tripling the amount of time it takes to display the properly decoded pictures. As a result, the acceptable reduction in picture quality during normal playback may become unacceptable during slow motion trick mode operation, particularly during very slow motion speeds. Thus, a need exists for a method and system for performing slow motion trick modes without significantly diminishing picture quality.

SUMMARY OF THE INVENTION

The present invention concerns a method of producing an optimal slow forward trick mode playback of a portion of video containing a plurality of pictures wherein at least a portion of the plurality of pictures are predictive pictures. The method includes the steps of: receiving a slow forward trick mode command; and inhibiting the display of an initial set of the plurality of pictures prior to obtaining a properly decoded predictive picture from the initial set of the plurality of pictures. The method can also include the steps of: selectively decoding the initial set of the plurality of pictures to obtain the properly decoded predictive picture from the initial set of the plurality of pictures; decoding subsequent pictures in the portion of video using the properly decoded predictive picture to obtain subsequent properly decoded pictures; and repeatedly displaying the properly decoded predictive picture and the subsequent properly decoded pictures a number of times based on a slow motion playback speed.

In one arrangement, the initial set of the plurality of pictures contains a plurality of predictive pictures and only the predictive pictures in the initial set of the plurality of pictures are decoded to obtain the properly decoded predictive picture from the initial set of the plurality of pictures. Further, each of the predictive pictures in the plurality of pictures can contain intra macroblocks and the properly decoded predictive picture can be obtained by decoding a predetermined number of the predictive pictures, wherein the predetermined number can be based in part on the amount of the intra macroblocks in each of the predictive pictures. In another arrangement, the portion of video does not contain any intra pictures.

The present invention also concerns a system for producing an optimal slow forward trick mode playback of a portion of video containing a plurality of pictures wherein at least a portion of the plurality of pictures are predictive pictures. The system includes: a controller for receiving the portion of video; and a video processor programmed to: receive a slow forward trick mode command; and inhibit the display of an initial set of the plurality of pictures prior to obtaining a properly decoded predictive picture from the initial set of the plurality of pictures. The system also includes suitable software and circuitry to implement the methods as described above.

DETAILED DESCRIPTION

Figure 1:
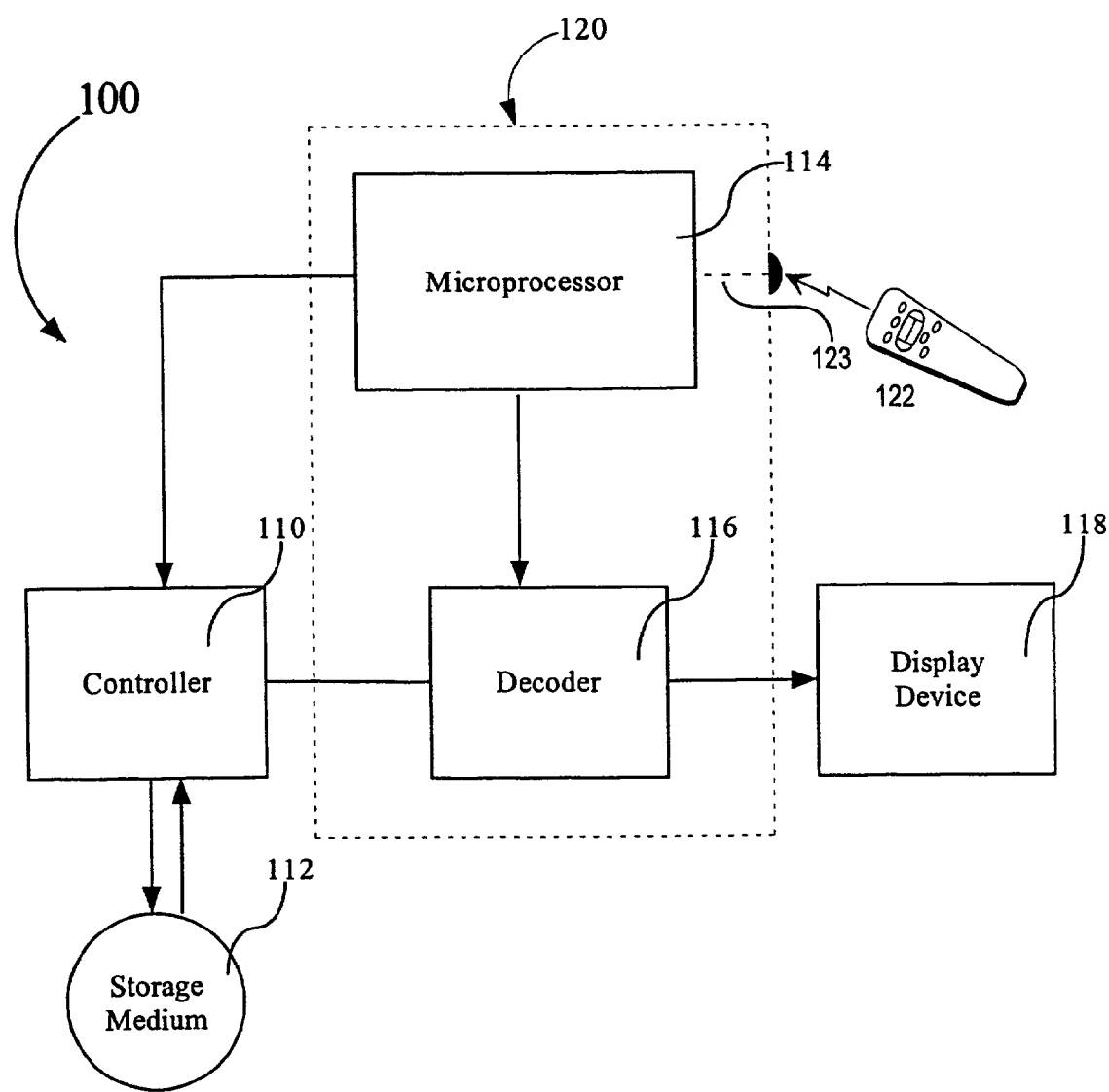
FIG. 1 is a block diagram of a system that can perform slow forward trick mode playback of recorded video in accordance with the inventive arrangements herein.

A system 100 for implementing the various advanced operating features in accordance with the inventive arrangements is shown in block diagram form in FIG. 1. The invention, however, is not limited to the particular system illustrated in FIG. 1, as the invention can be practiced with any other system capable of receiving a digitally encoded signal. In addition, the system 100 is not limited to reading data from or writing data to any particular type of storage medium, as any storage medium capable of storing digitally encoded data can be used with the system 100.

The system 100 can include a receiver or controller 110 for reading data from and writing data to a storage medium 112. The system 100 can also have a microprocessor 114. Control and data interfaces can also be provided for permitting the microprocessor 114 to control the operation of a decoder 116 and the controller 110. Suitable software or firmware can be provided in memory for the conventional operations performed by the microprocessor 114. Further, program routines can be provided for the microprocessor 114 in accordance with the inventive arrangements. The system 100 can also include a display device 118. It should be understood that all or portions of the microprocessor 114 and the decoder 116 can be considered a video processor 120 within contemplation of the present invention.

In operation, the microprocessor 114 can receive a slow forward trick mode command (123), for example from a switch or remote control arrangement (122) and, in response instruct controller 110 to read from the storage medium 112 a portion of program video containing a plurality of pictures of which at least a portion of the plurality of pictures are P pictures. The microprocessor 114 can then instruct the decoder 116 to selectively decode an initial set of the plurality of pictures for purposes of obtaining a properly decoded P picture from the initial set of the plurality of pictures. The microprocessor 114 can also inhibit the display of the initial set of the plurality of pictures prior to the properly decoded P picture from being obtained from the initial set of the plurality of pictures. The microprocessor can perform this inhibition step by instructing the decoder 116 to prevent the transfer of this initial set to the display device 118 while the properly decoded P picture is being obtained.

Once a properly decoded P picture is obtained, the decoder 116 can then decode subsequent pictures in the portion of program material to obtain subsequent properly decoded pictures. The microprocessor 114 can then instruct the decoder 116 to send repeatedly the properly decoded P picture and the subsequent properly decoded pictures to the display device 118 for their repeated display based on a slow motion playback speed. This process of producing an optimal slow forward trick mode will be explained in greater detail below.

Slow Forward Trick Mode Playback of Recorded Video

Figure 2:
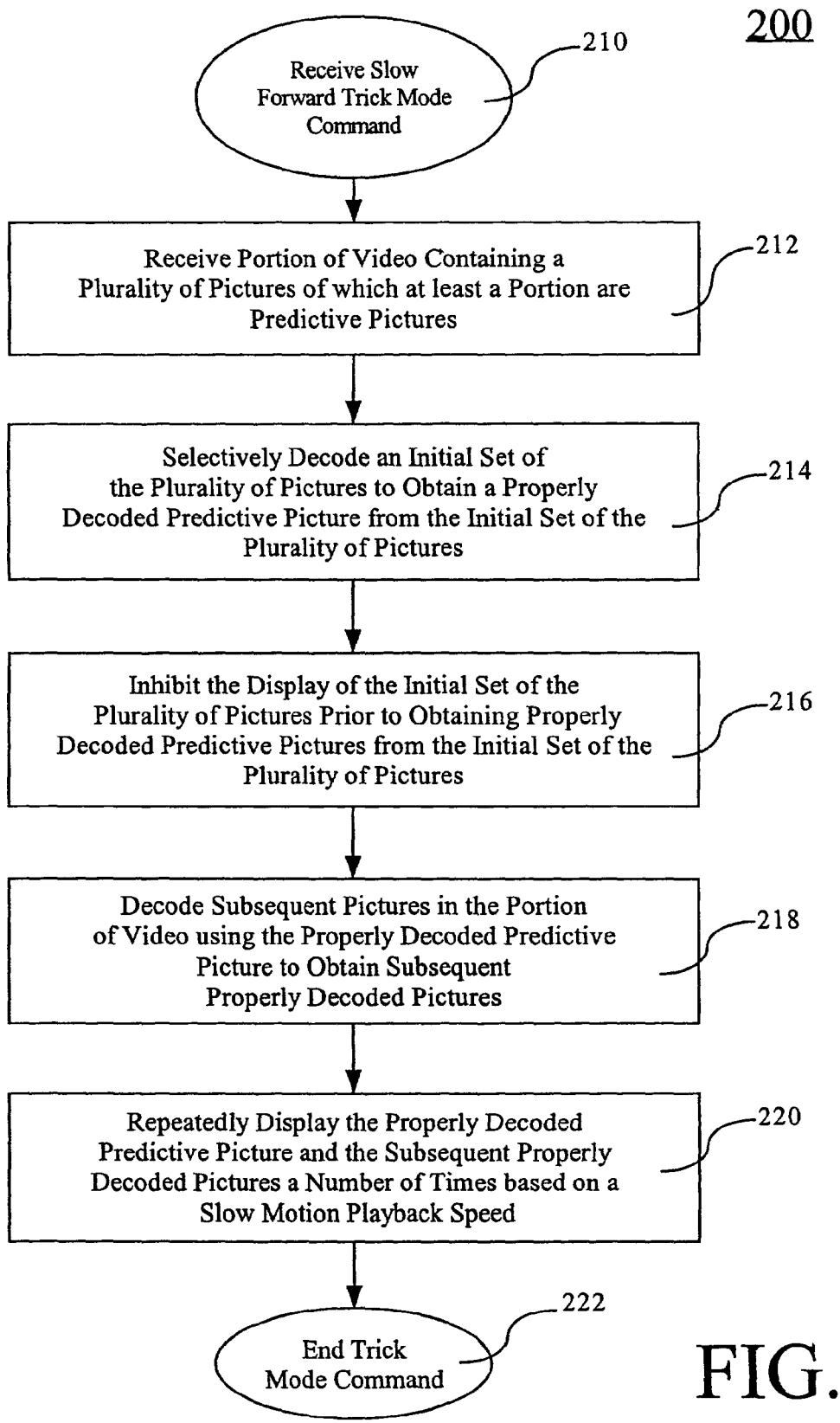
FIG. 2 is a flow chart that illustrates an operation of performing an optimal slow forward trick mode playback of recorded video in accordance with the inventive arrangements.

FIG. 2 illustrates a flowchart 200 that demonstrates one way in which an optimal slow forward trick mode playback of a portion of program video containing a plurality of pictures can be produced in which at least a portion of the plurality of pictures are P pictures. At step 210, a slow forward trick mode command can be received. At step 212, a portion of video containing a plurality of pictures of which at least a portion are P pictures can be received. In one arrangement, the program video portion does not contain any I pictures; however, it is understood that the invention is not so limited, as the invention can be practiced with portions of video that do contain I pictures.

Next, an initial set of the plurality of pictures can be selectively decoded to obtain a properly decoded P picture from the initial set of the plurality of pictures, as shown at step 214. In one arrangement, the initial set contains a plurality of P pictures, and only the P pictures in the initial set are decoded to obtain the properly decoded P picture from the initial set of the plurality of pictures. As noted earlier, many video broadcast signals that have been recorded onto a storage medium, particularly U.S. cable transmissions, do not contain I pictures. In such signals, a portion of each P picture is typically encoded with I macroblocks. Thus, a properly decoded P picture can be obtained by decoding a predetermined number of these P pictures based in part on the amount of I macroblocks in each P picture.

As an example, for many of these signals, approximately 20% of each P picture is encoded with I macroblocks. Therefore, if approximately 20% of each P picture in the initial set of the plurality of pictures is encoded with I macroblocks, then five P pictures in the initial set of the plurality of pictures can be decoded for purposes of producing a properly decoded P picture from the initial set of the plurality of pictures. It should be noted, however, that the invention is not limited to this particular example, as any other suitable number of P pictures in the initial set can be decoded for purposes of obtaining a properly decoded P picture. For instance, the P pictures used to obtain a properly decoded P picture can contain different percentages of I macroblocks. Also, it is understood that the invention is not limited to merely decoding P pictures in the initial set of the plurality of pictures, as other picture types in the initial set can be decoded.

At step 216, the display of the initial set of the plurality of pictures can be inhibited prior to the properly decoded P picture being obtained from the initial set of the plurality of pictures. Inhibiting the display of these pictures during the slow forward trick mode prior to obtaining a properly decoded P picture can eliminate the display of a substantial number of improperly decoded pictures. This inhibition process can also reduce the amount of time required to obtain the properly decoded P picture, particularly for a very slow forward trick mode, as the pictures that are decoded to produce the properly decoded P picture are not repeatedly displayed during the slow forward trick mode.

At step 218, once obtained, the properly decoded P picture can be used to decode subsequent pictures in the portion of video thereby producing subsequent properly decoded pictures. As shown at step 220, the properly decoded P picture and the subsequent properly decoded pictures can each be repeatedly displayed a number of times based on a slow motion playback speed. The flowchart 200 can stop at step 222 once the slow forward trick mode command is ended.

Although the present invention has been described in conjunction with the embodiments disclosed herein, it should be understood that the foregoing description is intended to illustrate and not limit the scope of the invention as defined by the claims.

What is claimed is:

1. A method optimized for slow forward trick mode playback of a portion of video containing a plurality of pictures wherein some of the plurality of pictures are predictive pictures comprising the steps of:

receiving a slow forward trick mode command; and, inhibiting the display of an initial set of the plurality of pictures prior to obtaining a properly decoded predictive picture from the initial set of the plurality of pictures.

2. The method according to claim 1, wherein the method further comprises the step of selectively decoding the initial set of the plurality of pictures to obtain the properly decoded predictive picture from the initial set of the plurality of pictures.

3. The method according to claim 2, wherein the method further comprises the step of decoding subsequent pictures in the portion of video using the properly decoded predictive picture to obtain subsequent properly decoded pictures.

4. The method according to claim 3, wherein the method further comprises the step of displaying the properly decoded predictive picture and each subsequently properly decoded picture a number of times in accordance with a slow motion speed.

5. The method according to claim 2, wherein the initial set of the plurality of pictures contains a plurality of predictive pictures and the selectively decoding step further comprises the step of decoding only the predictive pictures in the initial set of the plurality of pictures to obtain the properly decoded predictive picture from the initial set of the plurality of pictures.

6. The method according to claim 5, wherein each of the predictive pictures in the plurality of pictures contains intra macroblocks and the properly decoded predictive picture is obtained by decoding a predetermined number of the predictive pictures, wherein the predetermined number is based in part on the amount of the intra macroblocks in each of the predictive pictures.

7. The method according to claim 1, wherein the portion of video does not contain any intra pictures.

8. A system for optimized slow forward trick mode playback of a video portion containing a plurality of pictures wherein some of the plurality of pictures are predictive pictures comprising:

a controller receiving the video portion; and a video processor programmed to:

receive a slow forward trick mode command; and inhibit display of an initial set of the plurality of pictures prior to obtaining a properly decoded predictive picture from the initial set of the plurality of pictures.

9. The system according to claim 8, wherein the video processor is further programmed to selectively decode the initial set of the plurality of pictures to obtain the properly decoded predictive picture from the initial set of the plurality of pictures.

10. The system according to claim 9, wherein the video processor is further programmed to decode subsequent pictures in the portion of video using the properly decoded predictive picture to obtain subsequent properly decoded pictures.

11. The system according to claim 10, wherein the video processor is further programmed to display the properly decoded predictive picture and each subsequent properly decoded picture a number of times in accordance with a slow motion playback speed.

12. The system according to claim 9, wherein the initial set of the plurality of pictures contains a plurality of predictive pictures and the video processor is further programmed to decode only the predictive pictures in the initial set of the plurality of pictures to obtain the properly decoded predictive picture from the initial set of the plurality of pictures.

13. The system according to claim 12, wherein each of the predictive pictures in the plurality of pictures contains intra macroblocks and the video processor is further programmed to obtain the properly decoded predictive picture by decoding a predetermined number of the predictive pictures, wherein the predetermined number is based in part on the amount of intra macroblocks in each of the predictive pictures.

14. The system according to claim 8, wherein the portion of video does not contain any intra pictures.

* * * * *